(12) United States Patent
Ghassemi et al.

(10) Patent No.: US 11,976,482 B2
(45) Date of Patent: May 7, 2024

(54) PATCHING METHOD AND APPARATUSES

(71) Applicant: DAP Products, Inc., Baltimore, MD (US)

(72) Inventors: Katayoun Ghassemi, Nottingham, MD (US); Christopher Paul Stogbauer, Merrill, WI (US)

(73) Assignee: DAP Products, Inc., Baltimore, MD (US)

( * ) Notice: Subject to any disclaimer, the term of this patent is extended or adjusted under 35 U.S.C. 154(b) by 316 days.

(21) Appl. No.: 17/442,842

(22) PCT Filed: May 15, 2020

(86) PCT No.: PCT/US2020/033177
§ 371 (c)(1),
(2) Date: Sep. 24, 2021

(87) PCT Pub. No.: WO2020/232367
PCT Pub. Date: Nov. 19, 2020

(65) Prior Publication Data
US 2022/0170280 A1 Jun. 2, 2022

Related U.S. Application Data

(60) Provisional application No. 62/848,312, filed on May 15, 2019.

(51) Int. Cl.
*E04G 23/02* (2006.01)
*B32B 3/26* (2006.01)
(Continued)

(52) U.S. Cl.
CPC ............ *E04G 23/0207* (2013.01); *B32B 3/26* (2013.01); *B32B 7/02* (2013.01); *B32B 7/022* (2019.01);
(Continued)

(58) Field of Classification Search
CPC ............ E04G 23/0207; E04G 23/0203; E04G 23/0214; E04G 2037/42; B32B 7/022;
(Continued)

(56) References Cited

U.S. PATENT DOCUMENTS 5,643,668 A * 7/1997 Calhoun .................... C09J 7/29
428/354
2006/0096220 A1 * 5/2006 Greer .................. E04G 23/0207
52/514

(Continued)

OTHER PUBLICATIONS

ISR/WO, PCT/US20/33177, PCT Search Report and Written Opinion dated Jul. 17, 2020, International Searching Authority (ISA/US) (9 pgs).

*Primary Examiner* — Mark R Wendell
(74) *Attorney, Agent, or Firm* — Crawford Maunu PLLC

(57) ABSTRACT

As may be implemented in accordance with one or more aspects characterized herein, a wall patch is adhered to a wall surface having a damaged region. The wall patch has a base layer and a plurality of layers of transparent material stacked on the base layer, with the base layer being visible through the transparent material and therein aligned around the damaged region. A surface coating is applied to an area of the wall surface around the wall patch and to the wall patch, after which a top removable layer of the wall patch is removed to expose a top surface of an underlying one of the layers. A further coating is applied to the exposed top surface of the underlying layer, and to the area of the wall surface around the wall patch.

21 Claims, 11 Drawing Sheets

(51) Int. Cl.
*B32B 7/02* (2019.01)
*B32B 7/022* (2019.01)
*B32B 7/06* (2019.01)
*B32B 7/12* (2006.01)
*B32B 37/26* (2006.01)

(52) U.S. Cl.
CPC ............... *B32B 7/06* (2013.01); *B32B 7/12* (2013.01); *B32B 37/26* (2013.01); *E04G 23/0203* (2013.01); *E04G 23/0214* (2013.01); *B32B 2037/268* (2013.01); *B32B 2250/05* (2013.01); *B32B 2307/412* (2013.01); *B32B 2307/558* (2013.01); *B32B 2307/732* (2013.01); *B32B 2556/00* (2013.01); *B32B 2607/00* (2013.01)

(58) Field of Classification Search
CPC ........... B32B 7/0206; B32B 7/12; B32B 3/26; B32B 37/26

USPC .......................................................... 52/514
See application file for complete search history.

(56) References Cited

U.S. PATENT DOCUMENTS

| | | | |
|---|---|---|---|
| 2007/0215271 A1* | 9/2007 | McClintic | E04G 23/0203 156/289 |
| 2009/0288755 A1* | 11/2009 | Lewis | E04G 23/0203 156/574 |
| 2010/0227117 A1 | 9/2010 | Dan-Junbo et al. | |
| 2013/0125493 A1* | 5/2013 | Raheel | E04G 23/0207 52/514 |
| 2016/0017183 A1* | 1/2016 | Lam | C09J 7/38 428/41.8 |

* cited by examiner

PATCHING METHOD AND APPARATUSES

BACKGROUND

A variety of structures such as wall board or cement board are often subject to damage. For instance, gypsum-based materials often referred to as drywall, wallboard, and such can be readily damaged due to application of force, staining, punctures and other physical interactions. Such damage may result in holes, crushed areas, uneven surfaces and other visually perceptible characteristics.

Repairing structures such as wall board that are damaged in this regard can be challenging. For instance, it may be challenging to provide a repair that is structurally sound yet visually appealing. When patching holes or recesses, the resulting material is often visible when repainted. Furthermore, applying such patches can be time-consuming and difficult.

These and other matters have presented challenges to repairing structures, for a variety of applications.

SUMMARY

Various example embodiments are directed to a layered structure, such as a wall patch, its application and its manufacture. Such embodiments may be useful for addressing issues including those noted above in regard to repairing damaged surfaces. In particular, various embodiments are directed to a layered structure that facilitates covering or patching of damaged surfaces in a manner that mitigates visual detection of the covered or patched areas of the surfaces.

In accordance with an embodiment, a method for patching a wall is carried out as follows. A wall patch is adhered to a wall surface having a damaged region, the wall patch having a base layer and a plurality of layers of transparent material stacked on the base layer with the base layer being visible through the transparent material, including aligning the base layer around the damaged region. A surface coating is applied to an area of the wall surface around the wall patch and to a removable top layer of the plurality of layers of transparent material. The removable top layer is removed, therein exposing a top surface of an underlying one of the plurality of layers of transparent material. A further coating is applied to the exposed top surface of the underlying one of the plurality of layers of transparent material, and to the area of the wall surface around the wall patch.

Another embodiment is directed to a method for patching a wall. A wall patch is provided, including a base layer of material having upper and lower surfaces and a plurality of layers of transparent material stacked on the upper surface of the base layer. A first one of the layers is stacked on the base layer and each of the other layers is stacked on one of the other layers. Each of the plurality of layers has a lower surface area that extends laterally beyond the layer upon which it is stacked. The wall patch is aligned relative to an opening in a wall surface, with a perimeter of the base layer extending around at least a portion of the opening and with the lower surface of the base layer facing the opening and in contact with a portion of the wall surface adjacent the opening. The wall patch is adhered to the wall surface by adhering exposed regions of the lower surfaces of the plurality of layers and base layer to the surface around the opening.

Another embodiment is directed to a method as follows. A base layer of material is aligned to a surface, the base layer having upper and lower surfaces with a perimeter extending around at least a portion of an opening in the surface and with the lower surface of the base layer facing the opening and in contact with a portion of the surface adjacent the opening. A plurality of layers of material are stacked on the upper surface of the base layer, by stacking a first one of the layers on the base layer and stacking each of the other layers directly on one of the other layers. At least one of the stacked layers has a lower surface area that is larger than a lower surface area of one of the layers on which it is directly stacked. The base layer and the plurality of layers are adhered to the surface and around the opening therein, by adhering an exposed region of the lower surface of the at least one of the layers to the surface around the opening.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description and in connection with the accompanying drawings, in which.

Figure 1:
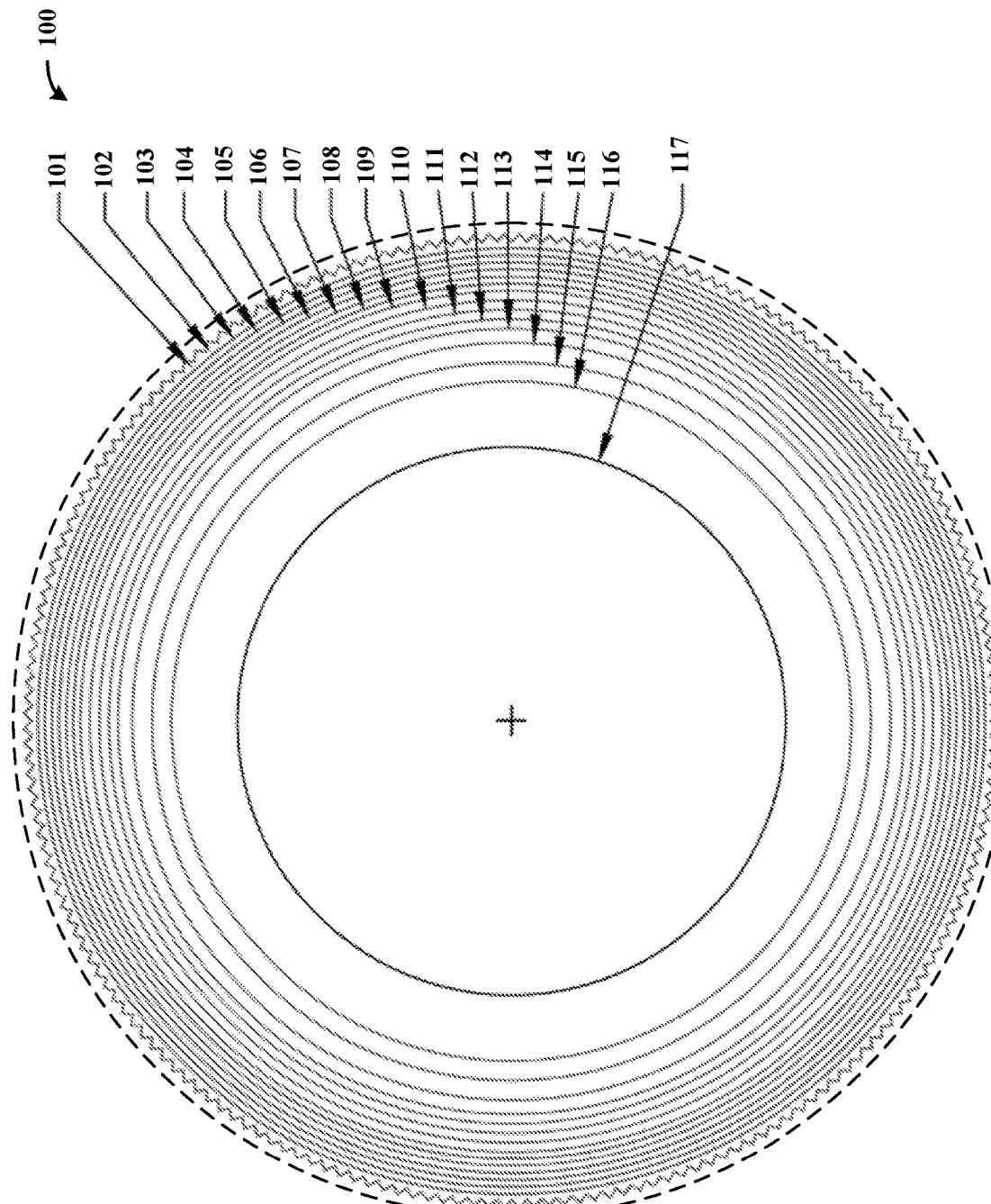
FIG. 1 shows an apparatus as may be implemented in accordance with one or more embodiments.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as may be used throughout this application is by way of illustration, and not limitation.

DETAILED DESCRIPTION

Aspects of the present disclosure are believed to be applicable to a variety of different types of articles of manufacture, apparatuses, systems and methods involving stacked-layer structures, such as may be implemented to patch openings or damages in a surface such as a wall. In certain implementations, aspects of the present disclosure have been shown to be beneficial when used in the context of patching damaged walls in which stacked layers are used to provide structural support while being tailored to mitigate visual detection of the presence of the patch. For instance, it has been recognized/discovered that stacked layers of increasing diameter/perimeter may mitigate the ability of the human eye to perceive the patch when applied to a wall and subsequently coated (e.g., painted, along with the wall), while providing desirable rigidity. While not necessarily so limited, various aspects may be appreciated through a discussion of examples using such exemplary contexts.

In certain embodiments, a patch includes a base layer of material and stacked layers of material on an upper surface of the base layer, with one of the stacked layers stacked on the upper surface of the base layer and the remaining stacked layers stacked on one of the other stacked layers. One or more of the stacked layers has a lower surface area that is larger than a lower surface area of one of the stacked layers on which it is directly stacked. For instance, each respective stacked layer may have a perimeter that is offset from and that extends around a perimeter of an underlying layer such that the resulting stack has a stepped edge.

In some embodiments, the stacked layers provide a stepped gradient defined by respective perimeters of the stacked layers and increasing in diameter and/or width from the base layer in a direction away from the surface the wall. Thickness of the stacked layers may be consistent or varied. In some embodiments, and upper layer of the stacked layers is thicker, relative to underlying layers of generally uniform thickness. For instance, a relatively base layer may be utilized for amenability in following an underlying surface, while being thick enough to mitigate wrinkling. In other embodiments, one or more of the stacked layers may be provided with a thickness that is less than a thickness of one of the stacked layers upon which it is directly stacked, for instance with decreasing thickness of respective stacked layers. This thickness variation may be implemented together with the aforementioned gradient. In some implementations, each of the stacked layers has a lower surface with an inner surface region in contact with and adhered to one of the stacked layers on which it is directly stacked, and an outer surface region that extends laterally beyond and around the perimeter of the one of the stacked layers on which it is directly stacked. The outer surface regions define the gradient and have an adhesive which facilitates coupling to a wall, such as by adhering the outer surface regions of various ones of the stacked layers to the wall around the opening.

The patch may be adhered to a wall (or other) surface and around an opening or other region therein, by adhering exposed regions of one or more of the stacked layers to the surface around the opening, with the lower surface of the base layer facing the opening. The base layer may, for example, be sized relative to the application such that it covers the opening, and with a thickness that provides strength relative to deflection in a direction of the opening. As such, the base layer can be centered or otherwise applied to cover the opening to provide desired strength. In this context, the opening may be a hole in the wall, a depressed area of the wall, or a damaged area of the wall exhibiting varying depth. The lower surface of the base layer faces the opening and may also be in contact with the wall adjacent the opening. Using this approach, the base layer and central region of the wall patch may provide significant structural rigidity, while stacked layers (as may be of increasing size) facilitate a smooth transition with respect to areas of the surface around the patch and therein mitigate visual detectability of the application, which mitigating deflection of the wall patch into the opening. Further, an upper/top layer of the patch may have a surface configured for adhering to paint, facilitating painting of the patch and, as may be appropriate, a surrounding surface. For instance, the upper/top layer surface may be coated with a material having matting properties, and may reduce gloss when using a semi-gloss paint. In some embodiments, an acrylic resin treatment is applied to the upper/top layer, for compatibility with paint.

The patch may be implemented in a variety of manners. Materials such as polyester, polypropylene, polyethylene, metal, cellulose and fiber may be utilized for respective layers. In some instances, the base layer may be provided with a less aggressive adhesive, little or no adhesive on the lower surface thereof, relative to the stacked layers. Such approaches may mitigate issues in which the patch may otherwise follow contours or features of an underlying surface. Adhesive thickness may be tailored to achieve desired adhesion while adding as little thickness to the overall apparatus. In addition, adhesion to an underling surface being repaired may be desirably higher relative to adhesion to an underlying patch layer, such that amount and/or adhesion characteristics of such adhesive may be tailored relative to a position at which the adhesive is used. For instance, a rigid adhesive (e.g., with high glass transition temperature (GTT)) may be used to provide strong adhesion to a surface being repaired, and to mitigate darting.

In addition, the respective layers may be formed separately and combined, such as with two or more layers (as referred to herein) formed as part of a continuous substrate with a thicker portion in a central area and stepped edges representing surfaces of the areas (e.g., as made via deposition, 3D printing or other approach). Where formed on a roll of material, the base and stacked layers may utilize material that facilitates flexibility and rapid roll formation.

Patch apparatuses as characterized herein may exhibit a variety of shapes, to suit particular applications. For instance, round, oval or rectangular layers may be utilized to suit different applications. Edges of one or more layers may be feathered to increase amalgamation between the surface being repaired and the patch apparatus. As an example, when repairing a round hole, a base and stacked layers of a generally round shape may be utilized to enhance blending of the patch apparatus relative to a surface being repaired. Accordingly, the shape the patch may be set/chosen based on the area being repaired.

In a particular application, a rectangular patch type apparatus may be utilized to cover joints between sheets of wall material, such as wallboard or sheetrock. A stepped gradient is provided with layers extending along a length of the patch and with the stepped gradient extending in a perpendicular direction relative to the length, as to be utilized along a length of joint (with a thicker portion at the joint). For application to joint intersections, a patch material having a cross shape may be utilized, with layers similarly providing a stepped gradient in a direction away from the respective joints to be covered, including a thicker portion along the intersecting joints.

In some embodiments, a patch apparatus as characterized herein has a removable layer on an upper layer thereof, and which is removable after installation. Such a removable layer may facilitate alignment of the patch relative to a hole or other defect in a surface to be covered, such as by permitting viewing of the underlying (e.g., base) layers and surface being repaired, after which the upper layer may be removed. In this context, adhesion between the removable layer and the rest of the patch may be set less than adhesion between the rest of the patch and the surface to which it is applied, to facilitate removal.

In some instances, the removable layer includes a graspable feature such as a tab coupled to the removable layer to facilitate grasping and removal of the removable layer. The tab may extend away from an upper surface area of the removable layer (e.g., laterally when applied to a wall surface), such as via placement on a top surface of the removable layer, or may protrude along an outer perimeter of the removable layer.

A carrier layer may be utilized for supporting a patch apparatus as characterized herein, prior to application to a surface. The base layer may be arranged on the carrier layer, with additional layers stacked thereon. Such a carrier layer may, for example, exhibit very low adhesion characteristics such that the carrier layer may be readily removed from exposed adhesive on the underside of layers of the patch apparatus. In some implementations, the carrier layer has a slit or other configuration that facilitates removal without damaging the base and/or stacked layers.

The patch apparatuses as characterized herein may utilize a variety of different types of materials. In various embodiments, a base layer includes a visual aspect, such as a colored, opaque or semi-opaque material, reflective portion or marker. For instance, the entire base layer may be tinted, or markers may be placed along a perimeter or other areas of the base layer for visualization. Layers stacked on the base layer exhibit transparency sufficient to allow viewing of the visual aspect of the base layer as well as an underlying surface to which the patch apparatus is to be applied. This approach may facilitate alignment of the patch to an underlying surface and a defect therein. For instance, when patching a hole in a wall surface that is similar in size or smaller in size relative to the base layer, the base layer may be centered on the hole by viewing the wall surface and base layer through the overlying layers. The base layer may thus be sized to target particular applications, to cover holes or other damage being repaired.

Various embodiments are directed to the application of patch apparatuses, such as those characterized herein. In some instances, thickness of a surface area around an applied patch apparatus is built up as follows. The patch apparatus is applied with one or more removable layers, such as characterized above, and a coating is applied to the patch apparatus (on the one or more removable layers) and to an area of the surface adjacent the patch apparatus. After applying the coating, a removable layer is removed from the patch, thus facilitating application of the coating around the patch without necessarily building up the coating around the perimeter of (or on) the patch. A further coating may also be applied. In connection with these embodiments, it has been recognized/discovered that applying a coating in this manner can help to visually mask the presence of the patch underlying a coating (such as paint).

The following discussion characterizes various embodiments, some of which may be implemented in connection with the figures and related discussion thereof that follows. One such embodiment is directed to a method for patching a wall using a wall patch having a base layer and a plurality of layers of transparent material stacked on an upper surface of the base layer. A first one of the stacked layers is stacked directly on the base layer and each of the other layers is stacked on one of the other layers, with each of the stacked layers having a lower surface area that extends laterally beyond the layer upon which it is stacked. In some instances, a top one of the stacked layers has a thickness greater than the plurality of layers and the base layer over which it is stacked. The wall patch is aligned over an opening in a wall surface with a perimeter of the base layer extending around at least a portion of the opening and with the lower surface of the base layer facing the opening and in contact with a portion of the wall surface adjacent the opening. The wall patch is adhered to the wall surface by adhering exposed regions of the lower surfaces of the plurality of layers and base layer to the surface around the opening. For instance, adhesive may be provided on the exposed regions of the lower surfaces of the plurality of layers and base layer, applied to such regions, and/or applied to the wall surface.

A removable layer having a graspable feature may be provided on a top one of the plurality of layers, and subsequently removed after adhering the wall patch to the wall surface. This may, for example, protect the upper surface of the top one of the plurality of layers, such as for subsequent application of a coating. A variety of coatings may be applied in this context. For instance, a first coating may be applied to an upper surface of the removable layer and to the wall surface around the wall patch, and the removable layer may then be removed to expose an upper surface of the top one of the plurality of layers. A second coating may then be applied to the upper surface of the top one of the plurality of layers and to the first coating. Further coatings may also be provided.

A transfer layer may be provided, with the wall patch temporarily adhered to the transfer layer with the base layer in contact therewith. For instance, the transfer layer may be provided with a coating that reduces adhesion strength of the wall patch thereto, and/or otherwise facilitates removal of the wall patch. The transfer layer may thus be removed, prior to aligning and adhering the wall patch to a wall.

The wall patch may be provided with a variety of shapes, sizes or features. In some implementations, the wall patch has a stepped gradient defined by respective perimeters of the base layer and layers of transparent material stacked thereon. The gradient is defined by thicknesses of the layers and the lower surface area extending beyond the layer upon which each layer is stacked.

In various embodiments, the a plurality of wall patches having different sizes (of similar or different shape) and numbers of layers, including a patch of greater size and a patch of smaller size, the patch of the greater size having a greater number of layers relative to the patch of the smaller size. One of the wall patches may be selected based on a size and/or shape of the opening in the wall surface to be patched, for instance to use as small of a patch as possible while ensuring that the base layer covers damage in the wall surface. The number of layers may also correspond to shape, for instance with a rectangular patch of similar size to circular patch. The selected wall patch aligned and adhered to the wall.

Another embodiment is directed to a method as follows. A base layer having upper and lower surfaces is aligned to a surface with a perimeter extending around at least a portion of an opening therein, and with the lower surface of the base layer facing the opening and in contact with a portion of the surface adjacent the opening. Layers of material are stacked on the upper surface of the base layer by stacking a first one of the layers on the base layer and stacking each of the other layers directly on one of the other layers. One or more of the stacked layers has a lower surface area that is larger than a lower surface area of one of the layers on which it is directly stacked (e.g., providing a stepped gradient defined by respective perimeters of the stacked layers and increasing in diameter from the base layer in a direction away from the surface). Accordingly, each stacked layers may have a lower surface with an inner surface region in contact with one of the stacked layers on which it is directly stacked and an outer surface region that extends laterally beyond and around the perimeter of the one of the stacked layers on which it is directly stacked. The layers may provide stiffness that mitigate deflection of the base layer into the opening, upon application of force.

A removable layer may be provided on the stacked layers, which may further include a graspable tab useful for removing the removable layer after installation. Such an approach may involve applying coatings as characterized herein. For instance, a coating may be applied to the removable layer and surrounding surface being repaired, the removable layer can be removed, and one or more further coatings may be applied. This approach facilitates application of the patch and a resulting surface finish that renders the patch visibly less detectable.

Adhesive may be applied in a variety of manners. In some instances, an outer surface region of each of the stacked layers has an adhesive and used to adhere the stacked layers around the opening to the surface. The base layer may also have adhesive, similar and/or different than that of the stacked layers, with exposed regions of the lower surfaces of the layers adhered around the opening. Further, adhesive may be applied to adhere the layers to one another. These adhesives may be the same or different, such as with different adhesion strength and/or different amount/thickness.

In accordance with another embodiment, an apparatus includes a base layer of material having upper and lower surfaces, and stacked layers of material on the upper surface of the base layer. Each stacked layer is stacked on and adhered to one of the other stacked layers, with one or more of the stacked layers having a lower surface area that is larger than a lower surface area of one of the stacked layers on which it is stacked (e.g., the upper of two stacked layers may have a perimeter or other exposed portion exposed portion extends laterally beyond and around perimeters of the stacked layers and base layer over which it is stacked). For instance, where the base layer and stacked layers have linear edges, the edges of each layer may be parallel to edges of the other layers with each stacked layer having a perimeter that extends around the perimeter of one of the layers on which it is stacked. The stacked layers may thus increase in diameter relative to underlying ones of the stacked layers. Adhesive on an exposed portion of each layer that overlaps an underlying layer may serve to adhere the apparatus, including underlying layers thereof, to a surface. Further adhesive may be utilized between the layers.

The thickness of each layer, surface area of each layer, and amount of adhesive between layers may be set to achieve certain characteristics. For instance, the base layer and a plurality of the stacked layers may have a common thickness, with a top one of the stacked layers has a thickness that is greater than the common thickness. It has been recognized/discovered that such an approach can provide desirable impact strength while also mitigating visibility of the patch after application. Other embodiments utilized layers of differing thickness, for instance decreasing thickness relative to underlying layers. For differently-sized patches, the number of layers and related strength/impact resistance can be balanced with visibility in this regard.

The stacked layers may have lower surfaces with an inner surface region in contact with and adhered to one of the stacked layers on which it is directly stacked and have an outer surface region that extends laterally beyond and around the perimeter of the one of the stacked layers on which it is directly stacked, and an adhesive on the outer surface region.

In various embodiments, the patch noted above is a wall patch with respective perimeters of the stacked layers defining a gradient configured to reduce an angle of a slope of transition along a radius of the wall patch. This facilitates rendering of the patch less detectable relative to a surrounding wall surface to which the patch is applied (e.g., after painting).

In certain embodiments, an upper one of the stacked layers covers the other stacked layers and base layer and has an upper surface region configured to adhere to a surface coating in response to the surface coating being applied to the upper surface region while the apparatus is adhered to a surface. This may, for example, facilitate painting.

A removable layer may be stacked on a top one of the stacked layers, and may have a tab configured and arranged for removing the removable layer from the top one of the stacked layers in response to a pulling force applied the tab, therein exposing a top one of the stacked layers. Where utilized with the aforementioned top layer, the removable layer may protect the paintable surface.

In various embodiments, layers of the patch exhibit transparency to facilitate viewing of a base layer and, for example, alignment to a surface being repaired. For instance, the base layer may exhibit a visual characteristic and the stacked layers may exhibit transparency characteristics that facilitate viewing of the visual characteristic through the stacked layers. The visual characteristic may provide visual positioning of the base layer relative to a surface being repaired, through the stacked layers and during application thereof to the surface.

Certain embodiments further include a carrier material configured to carry the base layer and stacked layers with the base layer coupled thereto. The carrier material may facilitate separation of the carrier material from the base layer for application of the base layer and the stacked layers to a surface.

Various embodiments are directed to methods of making or using patches as characterized herein. In a particular embodiment, layers of material are stacked on a base layer of material having upper and lower surfaces, by stacking and adhering a first one of the layers on the upper surface of the base layer, and by stacking and adhering each of a plurality further layers on one of the other layers. At least one of the stacked layers may have a lower surface area that is larger than a lower surface area of one of the stacked layers on which it is stacked and having adhesive on an exposed portion thereof. This approach may also involve aligning so that the adhesive on the exposed portion extends laterally beyond and around the perimeters of the stacked layers and base layer, such as for adhering to an underlying surface. Each of the plurality of further layers may be stacked with a perimeter that extends around a perimeter of the underlying layers on which it is stacked.

The base layer may be provided with a visual characteristic, such as color or a marker, and with the stacked layers having transparency characteristics that facilitate viewing of the visual characteristic through the stacked layers. This may facilitate alignment of the base layer to underlying damage being repaired.

A removable layer may also be stacked on a top one of the stacked layers. The removable layer may include a tab for grasping and removing the removable layer from the top one of the stacked layers, in response to a pulling force applied the tab, and exposing a top one of the stacked layers.

Consistent with the above, the stacked layers may be implemented in a variety of manners. In some implementations, one of the stacked layers has adhesive on an exposed portion thereof extending laterally beyond and around the perimeters of the stacked layers and base layer over which it is stacked. As such, the adhesive functions to adhere the one of the stacked layers, as well as all underlying stacked layers and the base layer, to the underlying surface. The underlying stacked layers may also include adhesive on exposed lower surface regions thereof. Using such approaches, the base layer may mitigate adhering of its lower surface (and of the apparatus in general) to edges of an opening or damaged region of the surface to which it is applied. Subsequent ones of the stacked layers may increase in diameter and/or decrease in thickness in a direction away from the underlying base layer. In some implementations, an upper one of the stacked layers of the apparatus covers the other stacked layers and base layer and has an upper surface region configured to adhere to a surface coating when applied to the upper surface region while the apparatus is adhered to a surface.

In a particular embodiment, each of a plurality of the stacked layers has a lower surface with an inner surface region in contact with and adhered to one of the stacked layers on which it is directly stacked, and an outer surface region that extends laterally beyond and around the perimeter of all of the stacked layers and the base layer over which it is stacked. Adhesive on the outer surface region adheres the apparatus to a surface, and may be implemented with or without further adhesive on exposed lower surfaces of the underlying stacked layers.

When implemented as a wall patch, respective perimeters of the stacked layers may define a gradient configured to reduce the angle of the slope of transition along a radius of the wall patch. Upon application and subsequent coating, the reduced angle of slope mitigates visual detection of the wall patch.

FIG. 1 shows an apparatus 100, as may be implemented in accordance with one or more embodiments. While fewer or more layers of varying characteristics may be implemented, the apparatus 100 is depicted with concentric, planar layers 102-117, with layer 117 acting as a base layer upon which the remaining layers are stacked. Further, a topmost removable layer 101 (on/behind layer 102 as depicted in dashed lines) may also be utilized to protect and support layer 102.

In connection with various embodiments, it has been recognized/discovered that the diameter and thickness of the respective layers in the apparatus 100 can be utilized to mitigate visibility of the apparatus when implemented as a wall patch for patching a hole or other damage in a wall. In some implementations, the base layer 117 has a greater thickness relative to ones of the remaining layers, with various ones of the remaining layers having similar diameters. In other implementations, the larger layers are generally thinner than the smaller layers, with the thickness of one or more of the layers increasing as the diameter of the layers decreases. These configurations of layers thickness provide strength and puncture resistance, while mitigating visibility of the individual patch layers.

The removable layer 101 may be implemented in a variety of manners. In some implementations, layer 101 is designed to be removable after applying the apparatus as a patch. This layer protects the surface of the underlying layer 102 (e.g., which may be prepped for painting or coating otherwise), and may further provide additional thickness for ease of handling and application. In this context, it has also been recognized/discovered that use of such a removable layer facilitates utilization of a very thin (e.g., thickness of ½ of a thousandth of an inch) material for layer (102), which will be the resulting top layer as applied with layer 101 thereafter removed, which would otherwise be difficult to handle and apply. It has further been recognized/discovered that, applying a coating to the removable layer and surrounding area of a surface to be repaired, and then subsequently removing the removable layer and further coating (e.g., painting) helps to hide the patch from visual detection. Accordingly, the (resulting) top layer 102 can be implemented with a very small thickness to mitigate visual detection of the wall patch.

The edge of layer 102 may be shaped in a variety of manners, such as with a pinked cut (e.g., similar to that depicted by way of example in FIG. 1). It has been recognized/discovered that utilization of such a pinked cut can help break up the outline of the perimeter of the apparatus when implemented as a patch, and allows an area for an ensuing surface coating such as paint to collect and help to taper the perimeter of the patch, further decreasing visibility thereof. Furthermore, utilizing a removable layer 101 over the pinked cut layer 102 can provide support that facilitates application of the apparatus while mitigating damage to the (ensuing) topmost layer 102 and the pinked region, resulting in a smooth and flush application to a surface that mitigates visual detection relative to adjacent regions of the applied-to surface (e.g., a wall).

In various implementations, base layer 117 is assembled with a less aggressive adhesive on a lower surface thereof, which may mitigate sticking of the lower surface of layer 117 (and the apparatus 100 overall) to surface characteristics of the surface to which it is applied, and which may improve visual integration of the apparatus with the surface being repaired. For instance, when applied for patching a damaged wall in which the base layer 117 is larger than the region of damage, use of a less aggressive adhesive on the lower surface of the base layer prevents the base layer from adhering to features such as an edge of a hole. Adhesive on exposed lower surfaces of one or more of the subsequent layers 102-116 adheres the apparatus 100 to the surface and maintains the base layer 117 in place. For instance, an outer region of the base layer 117 may be provided with adhesive, where an inner region of the base layer that is sufficiently large to cover an opening or other damage in the wall is devoid of such adhesive to mitigate coupling of the base layer to features of the opening or other damage.

As may be implemented in a manner consistent with one or more embodiments characterized above, the base layer 117 may be made of a tinted or opaque type material, or may have a marker thereon, with layers stacked thereon having transparency characteristics that facilitate viewing of the base layer 117 and a surface to be repaired through the other layers. This facilitates alignment of the base layer relative to a repair, and also provides a visual check to ensure that the base layer 117 will cover an opening or other damage to be repaired. For instance, when applied in a kit concept with respective patches of different sizes, this approach may be utilized to ensure a properly-sized patch is applied.

The thickness of the respective layers may be set in accordance with particular applications. In a specific embodiment, the base layer 117 and stacked layers 103-116 have a common thickness, and upper layer 102 has a greater thickness. In another specific embodiment, the apparatus 100 exhibits dimensions and/or thicknesses as follows. Layers 101-105 may be 48 gauge, in which layer 102 may further include a paint-receptive coating or coating receptive to other further surface treatments. Layers 106-107 may be 75 gauge, layers 108-109 may be 92 gauge, Layers 110 and 111 may be 120 gauge, layers 112 and 113 may be 142 gauge, layers 114 and 115 may be 200 gauge, and layers 116 and 117 (base layer) may be 300 gauge. With regard to diameter, layers 101-102 may be 6.122 in., layer 103 may be 6.042 in., layer 104 may be 5.952 in., layer 105 may be 5.862 in., layer 106 may be 5.772 in., layer 107 may be 5.682 in., layer 108 may be 5.592 in., layer 109 may be 5.500 in., layer 110 may be 5.380 in., layer 111 may be 5.260 in., layer 112 may be 5.140 in., layer 113 may be 5.020 in., layer 114 may be 4.840 in., layer 115 may be 4.590 in., layer 116 may be 4.340 in., and base layer 117 may be 3.500 in. Each of layers 102-116 may be implemented with adhesive on a lower surface thereof, with base layer 117 devoid of adhesive or with adhesive limited to an upper surface thereof.

Figure 2:
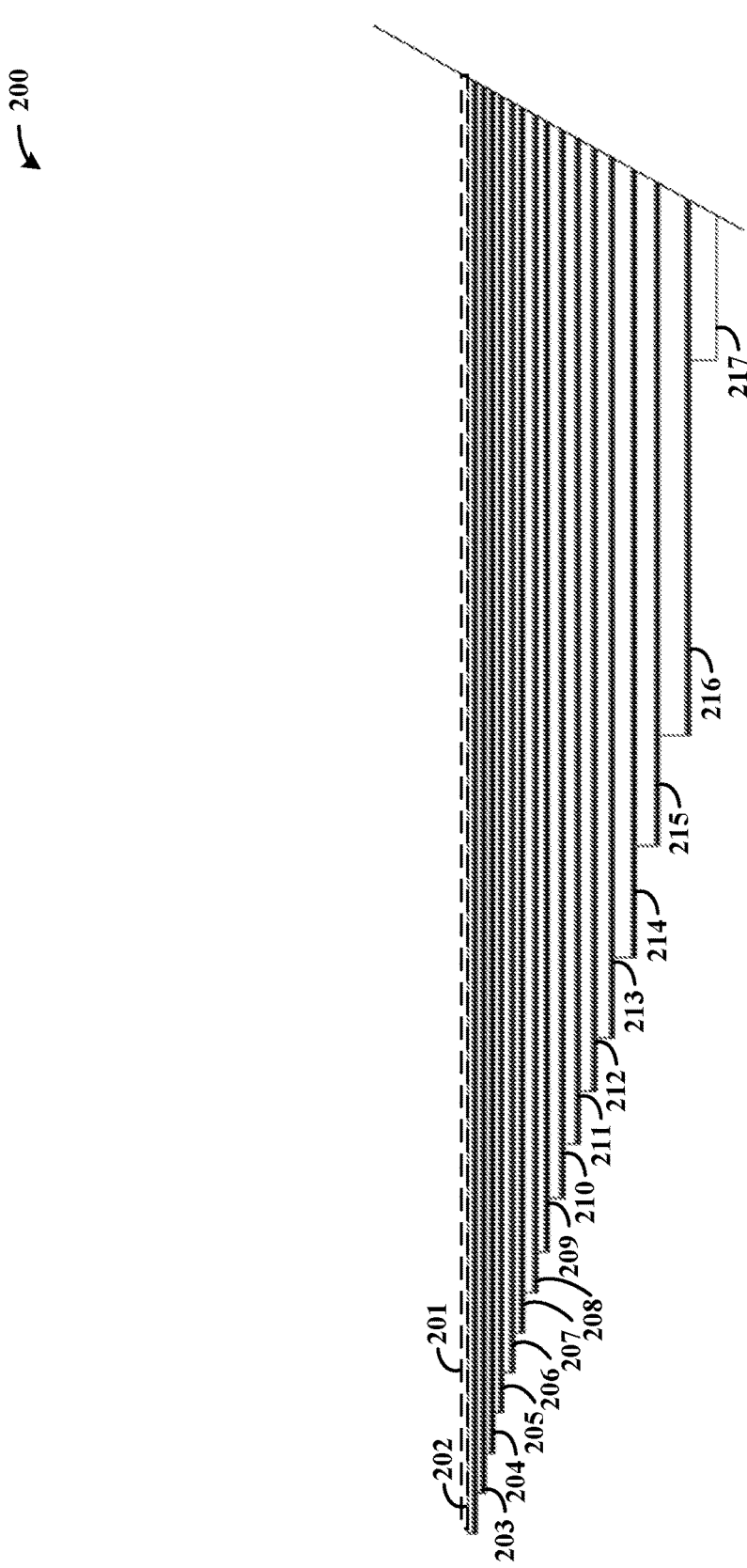
FIG. 2 shows a cross-sectional view of a patch having respective layers of film coated with adhesive, as may be implemented in accordance with one or more embodiments.

FIG. 2 shows a cross-sectional view of a wall patch 200 having respective layers of film coated with adhesive, as may be implemented in accordance with one or more embodiments. The wall patch 200 may, for example, be implemented in accordance with the apparatus 100 shown in FIG. 1, as a cross-section thereof. The all patch 200 has layers 202-217, with some or all of layers 202-216 having an adhesive on a lower surface thereof, and base layer 217 having an adhesive that may, for example, be less aggressive than adhesive on other layers. Layer 201 is shown as optionally included as a protective layer, which may be utilized on the wall patch 200 through installation thereof over a damaged region of a wall, and then removed. Similar to layer 101 in FIG. 1, layer 201 may facilitate application of the wall patch and protection of layer 202, which can be made very thin via use of removable layer 201.

Figure 3:
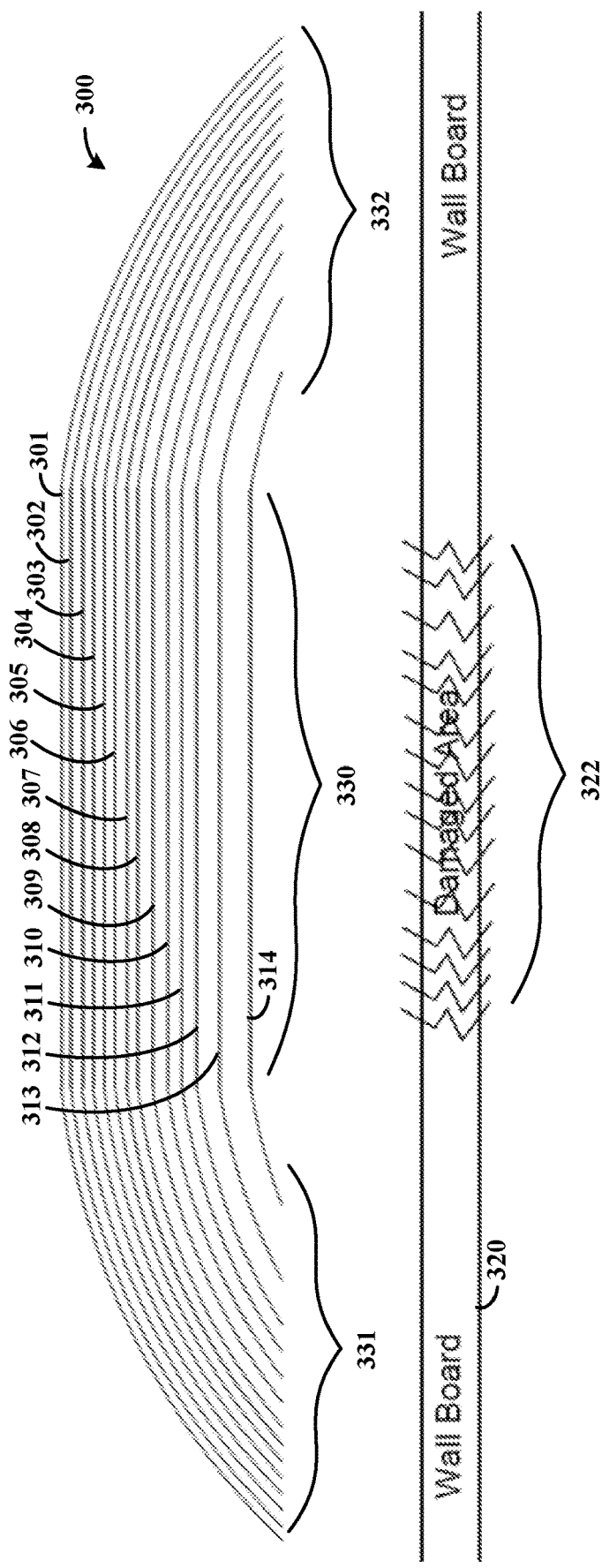
FIG. 3 shows patch having a plurality of film layers, as may be implemented in accordance with one or more embodiments.

FIG. 3 shows wall patch 300 having a plurality of film layers 301-314, for application to a wall board 320. Region 330, including a lower surface of base layer 314, may have a less aggressive adhesive, while regions 331 and 332 include adhesive configured to secure the wall patch 300 to a wall surface. Accordingly, as applied to the wall board 320, region 330 is aligned to a damaged area 322 such that the lower surface thereof does not adhere directly to the damaged area. Adhesive on regions 331 and 332 adheres the wall patch 300 to portions of the wall board 320 around the damaged area 322. The diameter of the respective layers 301-314 increases going away from the wall board 320, which the thickness may be decreased to mitigate visibility of the applied wall patch.

Figure 4:
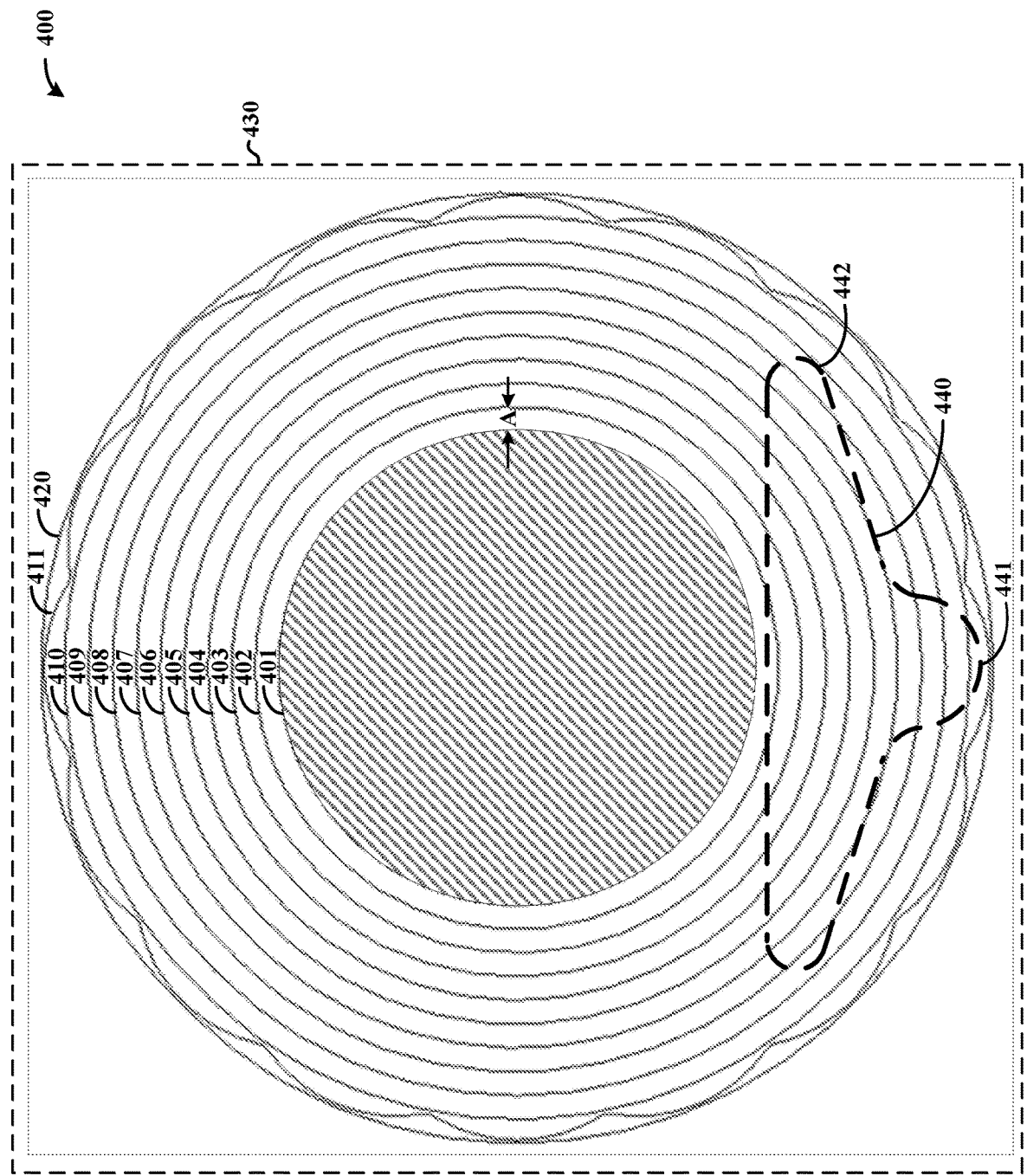
FIG. 4 shows a top view of a patch having a plurality of film layers, as may be implemented in accordance with one or more embodiments.

FIG. 4 shows a top view of a patch 400 having a plurality of film layers, as may be implemented in accordance with one or more embodiments. The patch 400 includes a lower base layer 401, on which respective layers 402-411 are stacked, along with a removable top layer 420. Each of layers 402-411 may be adhered to an underlying layer upon which it is stacked, and each includes a portion thereof that overlaps the underlying layer. For instance, surface area region "A" along the perimeter of layer 402 overlaps underlying layer 401. The overlapping portions of each layer may similarly include an adhesive, as may the exposed underside of base layer 401 (which may affect coloration/shading of the base layer). Further, the number of layers 401-411 may be increased or decreased to suit particular applications, and may be set for achieving desirable strength while mitigating visibility of the patch upon application and, where applicable, related finishing.

The underlying surface of one or more layers 401-411 may be coated in an adhesive for adhering to an underlying layer and/or to a surface to which the patch 400 is to be applied. Such a coating may be uniform or non-uniform. For instance, adhesive coating on the overlapping portion may be thicker and/or of a different material relative to adhesive between the stacked layers.

Each of layers 402-420 and any adhesive used therewith may be transparent or otherwise permit light to pass such that the base layer 401 is visible through the overlying layers. For instance, as shown in FIG. 4, the underlying base layer 401 may be seen through the upper layers 402-411 (and 420). This may facilitate alignment of the base layer relative to a damaged surface upon which the patch is to be applied.

In some implementations, the patch 400 may include a removable carrier layer 430 upon which the ensuing layers 401-411 and 420 are placed until application. When the patch is to be applied to a surface, the carrier layer 430 may be removed, exposing adhesive on the undersides of one or more of layers 401-411.

Removable top layer 420 may be utilized in a variety of manners. In some implementations, top layer 420 is left in place after applying the patch 400 to a surface, while a coating is applied over the top layer and on surrounding areas of the surface. The top layer 420 may then be removed, for instance after the surrounding surface has dried, exposing layer 411 which may then be subsequently coated as well. The top surface of layer 411 may be coated for adhesion to a coating material such as paint, for such a subsequent coating. With this approach, build-up of the coating is less on the remaining portion of the patch 400 relative to the coating applied to the surrounding surface. It has been recognized/discovered that such an approach can work to hide visibility of the patch after application.

In some embodiments, a tab 440 is adhered to and/or part of the top layer 420, and assists in removal thereof. The tab 440 may have a grasping portion 441 that may be lifted relative to the underlying surface of top layer 420, and an adhered portion 442 that is adhered to and/or integrated with the top layer. Accordingly, after application of the patch 440 (and, if applicable, after applying a coating to the patch and surrounding area), the grasping portion 441 may be lifted from the surface of top layer 420, grasped and used to remove the top layer, exposing an upper surface of underlying layer 411. The tab may be implemented in a variety of manners, for instance with a slit underneath to facilitate removal of the top layer 420, which may for example be perforated in alternating ties (e.g., a 0.131" tie and 0.375" slit alternating along a line).

Figure 5:
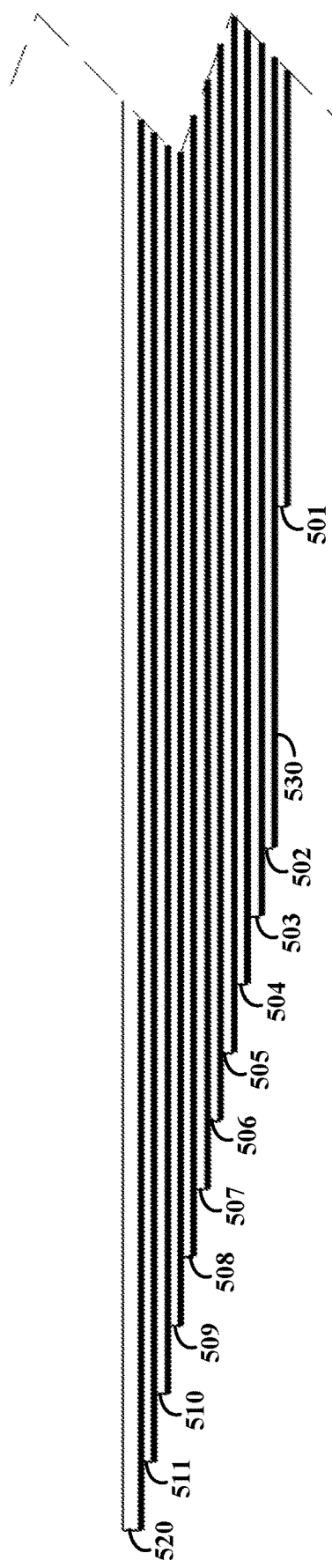
FIG. 5 shows a cross-sectional view of a patch having a plurality of film layers, as may be implemented in accordance with one or more embodiments.

FIG. 5 shows a cross-sectional view of a patch 500 having a plurality of film layers, as may be implemented in accordance with one or more embodiments. In certain embodiments, the patch 500 is implemented as patch 400, with the cross-section as shown corresponding to the stacked layers in FIG. 4. For instance, base layer 501 may be implemented as base layer 401 with ensuing layers 502-511 corresponding to similarly numbered layers 402-411 in FIG. 4, with a removable top layer 520 also corresponding to removable layer 420. The patch 500 is also shown with adhesive on the underside of each of layers 501-511 and 520, with adhesive 530 on the underside of layer 502 labeled by way of example.

The layers as depicted in the cross-sectional view of FIG. 5 may represent the corresponding layers in FIG. 4, and may be implemented with a variety of sizes, thicknesses, amount of adhesive between layers, and structural characteristics. For instance, it has been recognized/discovered that, utilizing certain patch thickness to diameter ratios for respective stacked patches can render the patch less visible, when applied to a surface. This is useful, for example, to facilitate patching of damaged surfaces such as walls in a manner that is not readily detectable by the human eye. The following discusses exemplary embodiments in this context.

In certain implementations, patch 400 has a 6-inch diameter and, when implemented to cover a 3 inch damage area (e.g., a 3 inch diameter hole), a ratio of the contact surface area to non-contact surface area for a surface being repaired is 21.1 to 7.06. A minimum of a 3 to 1 ratio of contact versus non-contact area to a surface may be maintained for a 6-inch patch.

In another implementation, a patch has a 4-inch diameter and, when implemented to cover a 2 inch damage area (e.g., a 2 inch diameter hole), has a ratio of contact surface area to non-contact surface for a surface being repaired of 9.5 to 3.14. A minimum of a 3 to 1 ratio of contact surface area to non-contact surface area may also be maintained for the 4-inch patch. Such a 4-inch patch may include the same or fewer layers than depicted in FIG. 4 and characterized above with the 6-inch patch. The number of layers for the 4-inch patch may be set to achieve certain structural characteristics, such as impact resistance as characterized herein, and in some instances is 5 layers having a thickness as depicted in the tables below.

In a further implementation, a 2-inch patch for application to a 1 inch damage area (e.g., a 1" diameter hole) has a ratio of the contact surface area to non-contact area of 3.14 to 0.785. A minimum of a 4 to 1 ratio of contact surface area to non-contact surface area may be maintained for the 2-inch patch. Such a 2-inch patch may have fewer layers than depicted in FIG. 4 and characterized above for the 6-inch patch. The number of layers for the 2-inch patch may also be set to achieve certain structural characteristics, such as impact resistance as characterized herein, and may utilize four layers as characterized in the table below.

Tables 1-3 below depict respective embodiments involving 6", 4" and 2" patches, with ratios of distance to thickness implemented to create a gradient that mitigates visibility of the patch after application, relative to surrounding surface area. The layers may, for example, have an adhesive layer of about a 5 mil thickness on an underside thereof. Other embodiments may include fewer or more such layers as well.

TABLE 1

| FILM | DIAMETER | Surface Area(in$^2$) | Ratio SA/thickness (in2/mil) |
|---|---|---|---|
| 2 mil | 6.000 | 28.3 | 14.1 |
| 75 GAUGE | 5.700 | 25.5 | 34.0 |
| 75 GAUGE | 5.400 | 22.9 | 30.5 |
| 75 GAUGE | 5.100 | 20.4 | 27.2 |
| 75 GAUGE | 4.800 | 18.1 | 24.1 |
| 75 GAUGE | 4.500 | 15.9 | 21.2 |
| 75 GAUGE | 4.200 | 13.8 | 18.5 |

TABLE 1-continued

| FILM | DIAMETER | Surface Area(in$^2$) | Ratio SA/thickness (in2/mil) |
|---|---|---|---|
| 75 GAUGE | 3.900 | 11.9 | 15.9 |
| 75 GAUGE | 3.600 | 10.2 | 13.6 |
| 75 GAUGE | 3.300 | 8.5 | 11.4 |
| 75 GAUGE | 3.000 | 7.1 | 9.4 |

TABLE 2

| FILM | DIAMETER | Surface Area(in$^2$) | Ratio SA/thickness (in2/mil) |
|---|---|---|---|
| 2 mil | 4.000 | 12.6 | 6.3 |
| 75 GAUGE | 3.750 | 11.0 | 14.7 |
| 75 GAUGE | 3.500 | 9.6 | 12.8 |
| 75 GAUGE | 3.250 | 8.3 | 11.1 |
| 75 GAUGE | 2.000 | 3.1 | 4.2 |

TABLE 3

| FILM | DIAMETER | Surface Area(in$^2$) | Ratio SA/thickness (in2/mil) |
|---|---|---|---|
| 1.5 mil | 2.000 | 3.1 | 2.1 |
| 75 GAUGE | 1.750 | 2.4 | 3.2 |
| 75 GAUGE | 1.500 | 1.8 | 2.4 |
| 75 GAUGE | 1.000 | 0.8 | 1.0 |

The 2, 4 and 6 inch patches as characterized above may be implemented to achieve certain impact resistance, upon application to a surface and over respective openings of 3 inch, 2 inch and 1 inch, respectively. In certain embodiments, the 2 inch patch exhibits 12.7 in-lbs impact strength to failure with a 0.84" diameter probe applied to the center of the patch. In other embodiments, a 4 inch patch exhibits 23.2 in-lbs impact strength to failure with a 1.5" diameter probe applied to the center of the patch. In further embodiments, a 6 inch patch exhibits 56.6 in-lbs impact strength, also with a 1.5" diameter probe applied to the center of the patch.

Table 4 depicts a variety of numbers of layers, related film thickness ranges and diameter ranges, as well corresponding surface area and ratios of surface area to thickness, as may be utilized in connection with one or more embodiments.

TABLE 4

| FILM | Diameter(in) | Surface Area(in$^2$) | Ratio SA/thickness (in2/mil) |
|---|---|---|---|
| 1-10 mil | 1-10 | 0.79-78.5 | 0.08-78.5 |
| 0.5-9 mil | 0.7-9.7 | 0.38-73.9 | 0.04-148 |
| 0.5-9 mil | 0.4-9.4 | 0.13-69.4 | 0.01-139 |
| 0.5-9 mil | 0.1-9.1 | 0.008-65.0 | 0.001-130 |
| 0.5-9 mil | 0.1-8.8 | 0.008-60.8 | 0.001-122 |
| 0.5-9 mil | 0.1-8.5 | 0.008-56.8 | 0.001-113 |
| 0.5-9 mil | 0.1-8.2 | 0.008-52.8 | 0.001-106 |
| 0.5-9 mil | 0.1-7.9 | 0.008-49.0 | 0.001-98.0 |
| 0.1-9 mil | 0.1-7.6 | 0.008-45.3 | 0.001-453 |
| 0.1-9 mil | 0.1-7.3 | 0.008-41.8 | 0.001-418 |
| 0.1-9 mil | 0.1-7.1 | 0.008-38.5 | 0.001-385 |

Figure 6:
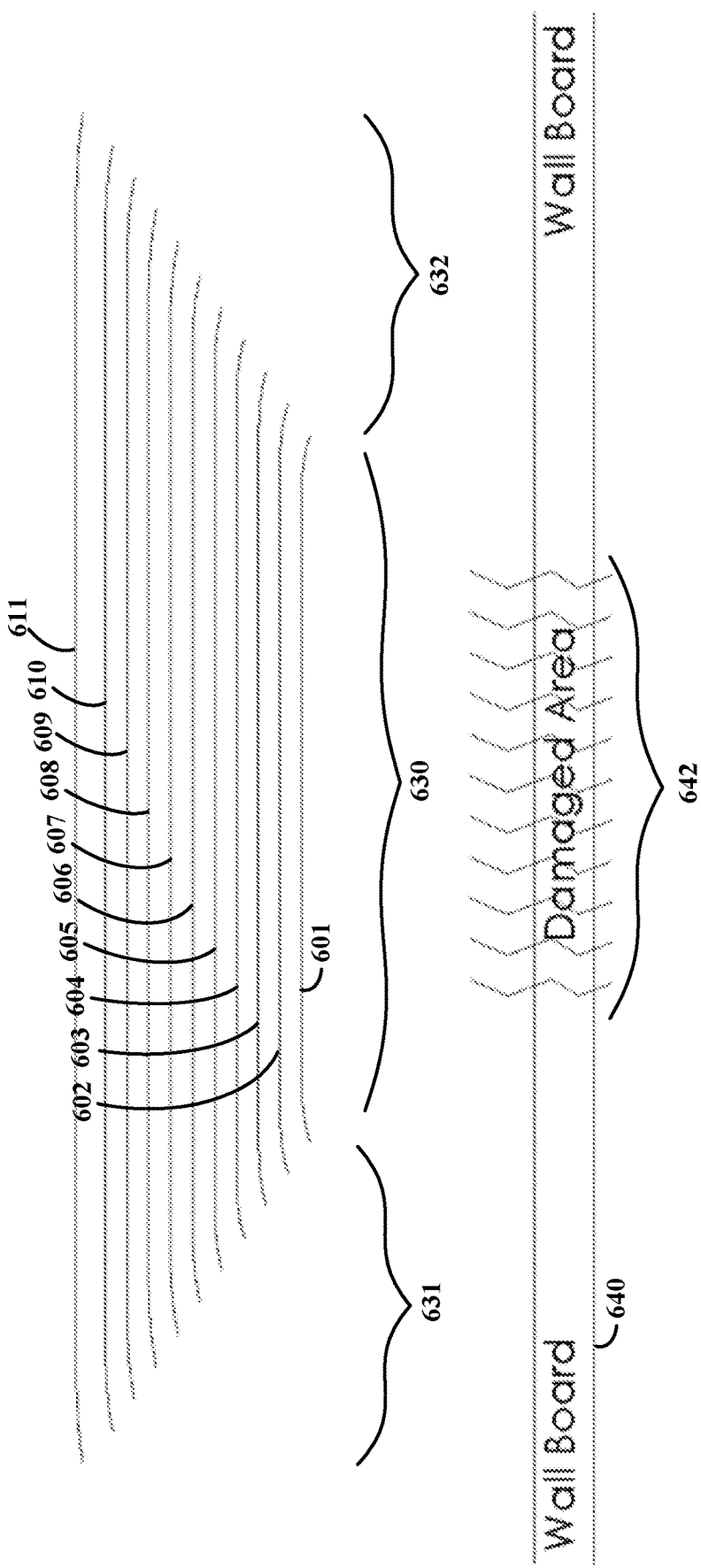
FIG. 6 shows a cross-sectional view of a patch having a plurality of film layers and its application to a wall board, as may be implemented in accordance with one or more embodiments.

FIG. 6 shows a cross-sectional view of a patch 600 having a plurality of film layers 601-611, for application to a wall board 640, as may be implemented in accordance with one or more embodiments. The patch 600 includes a base layer 601 with stacked layers 602-611. These layers may, for example, be implemented with the layers shown in FIGS. 4 and 5, and a further removable layer may be included over layer 611. The wall board 640 is shown by way of example with a damaged area 642. However, a similar approach may be utilized to repair other surfaces. A central region 630 of the patch is utilized to cover the damaged area, with regions 631 and 632 corresponding to perimeter areas of the layers 601-611 extending down over the edge of the underlying layers for adhering to the surface of the wall board 640.

Figure 7:
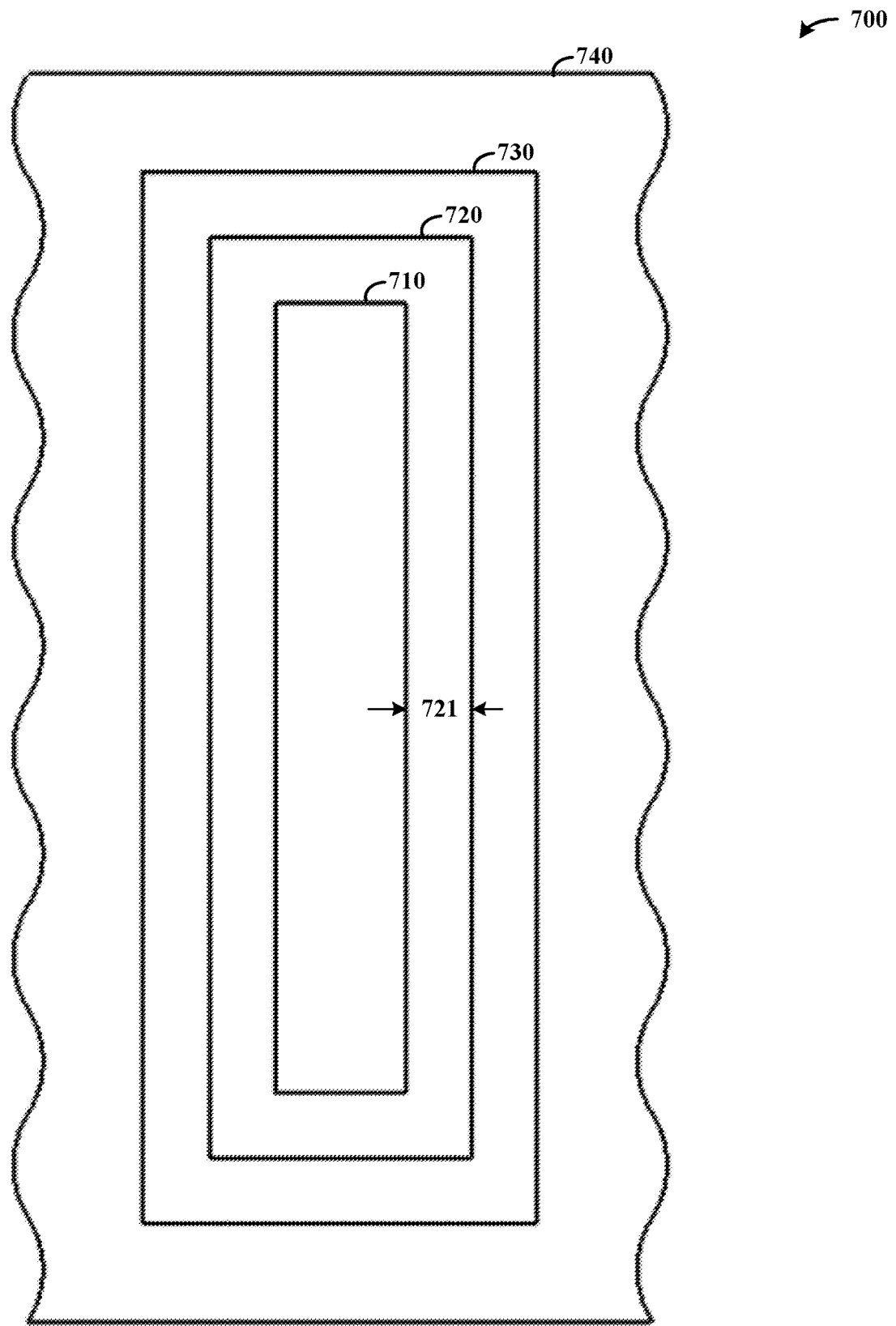
FIG. 7 shows rectangular patch/joint tape having a plurality of film layers, as may be implemented in accordance with one or more embodiments.

FIG. 7 shows rectangular patch/joint tape 700 having a plurality of film layers, as may be implemented in accordance with one or more embodiments. The patch/joint tape 700 may, for example, be applied to cover a rectangular or elongated damaged region of a surface, or may be applied to an elongated joint between surfaces such as a joint between wall boards. The patch/joint tape 700 includes a base layer 710 and stacked layers 720-740 that are stacked thereupon. Additional or fewer layers may be implemented, to suit particular applications. The top layer 740 is shown with a contoured edge on lateral elongated sides thereof, by way of example. Such a contoured edge may also be utilized on the shorter sides (upper/lower sides in FIG. 7). Each layer may include an adhesive for adhering to underlying layers, with exposed regions of each layer (including region 721 of layer 720) having an adhesive for adhering to an underlying surface. Layers 720-740 may have transparency characteristics that facilitate viewing of underlying base layer 710 for alignment to a surface to which the patch/joint tape 700 is to be applied. In these contexts, the layers shown in FIG. 7 may be implemented in a manner similar to those characterized in other embodiments, such as depicted in FIGS. 4-6. Accordingly, other shapes may be implemented in a similar manner.

Figure 8:
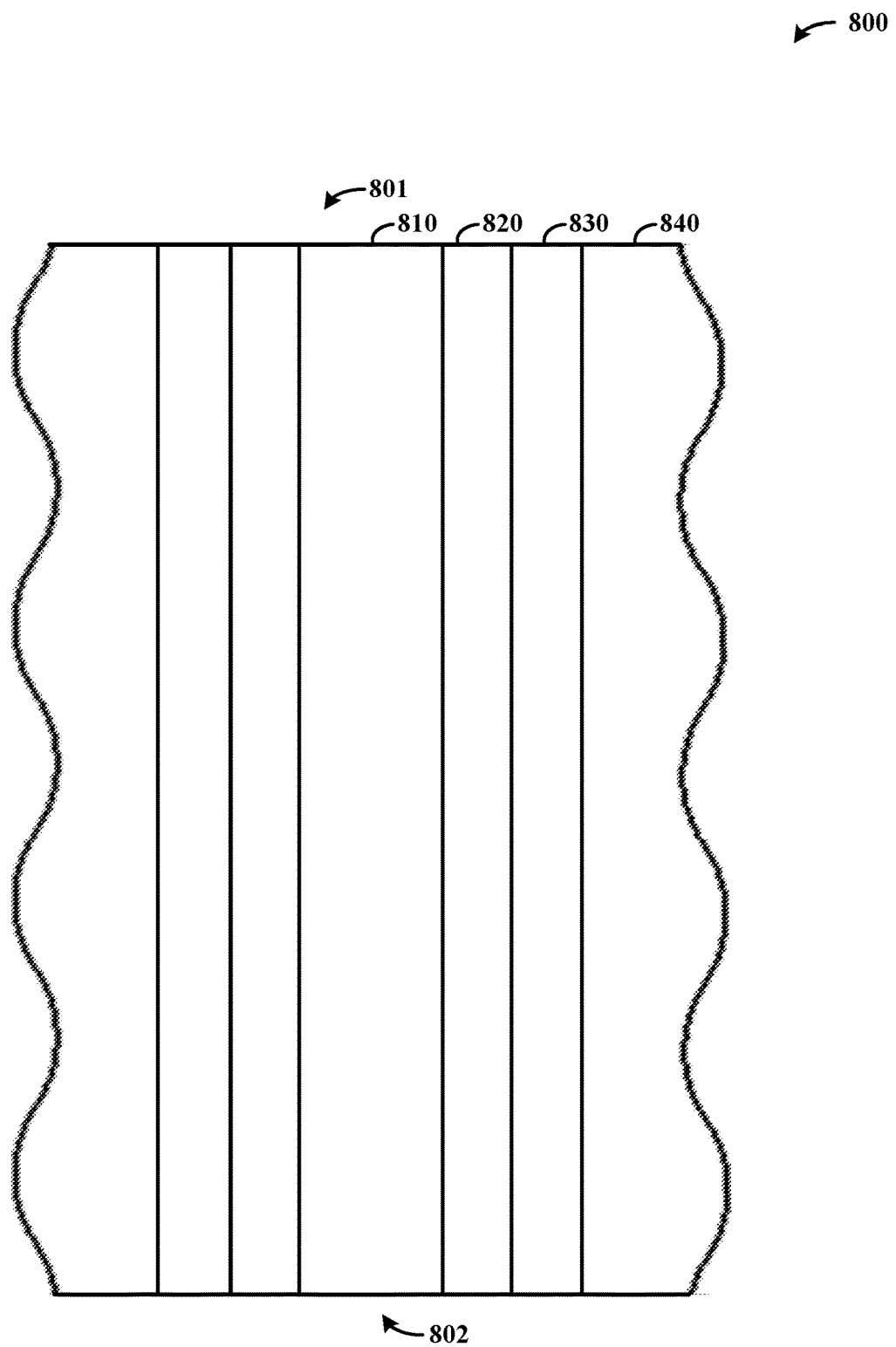
FIG. 8 shows a joint tape having a plurality of film layers, as may be implemented in accordance with one or more embodiments.

FIG. 8 shows a patch/joint tape 800 having a plurality of film layers, as may be implemented in accordance with one or more embodiments. The patch/joint tape 800 may, for example, be implemented in a manner similar to the patch/joint tape 700 of FIG. 7, with a base layer 810 and stacked layers 820-840 stacked thereupon. The stacked layers 820-840 overlap on opposing elongated sides of the base layer 810, and may be implemented without such overlap on upper edge 801 and lower edge 802. The stacked layers 820-840 are adhered to underlying layers, with all layers having an adhesive for adhering to an underlying surface. This approach may facilitate, for example, application to wall board joints in which the patch/joint tape 800 is extended to a feature such as an intersection of a wall and ceiling or floor, or at an intersection between walls that meet at an angle. This approach may also facilitate utilization for multidirectional joints, such as four-way joints where four separate sections of wall board meet (e.g., as applicable for use with the patch shown in FIG. 10, such as with end portions thereof truncated as depicted via dashed lines 1040-1043 therein).

Another embodiment is directed to a wall patch kit having a plurality of different wall patches. In one implementation, a wall patch kit includes 2", 4" and 6" patches as characterized in the tables above. Such a kit may further include additional sized diameters, which may have a number of layers that corresponds to size such that patches of larger size have additional layers (e.g., with a similar ratio of number of pads to diameter as in the 6" patch). In other implementations, a wall patch kit has a variety of shapes, such as those shown in the following figures, square shapes, rectangular shapes (e.g., for electrical box openings), oval shapes, and others.

Figure 9:
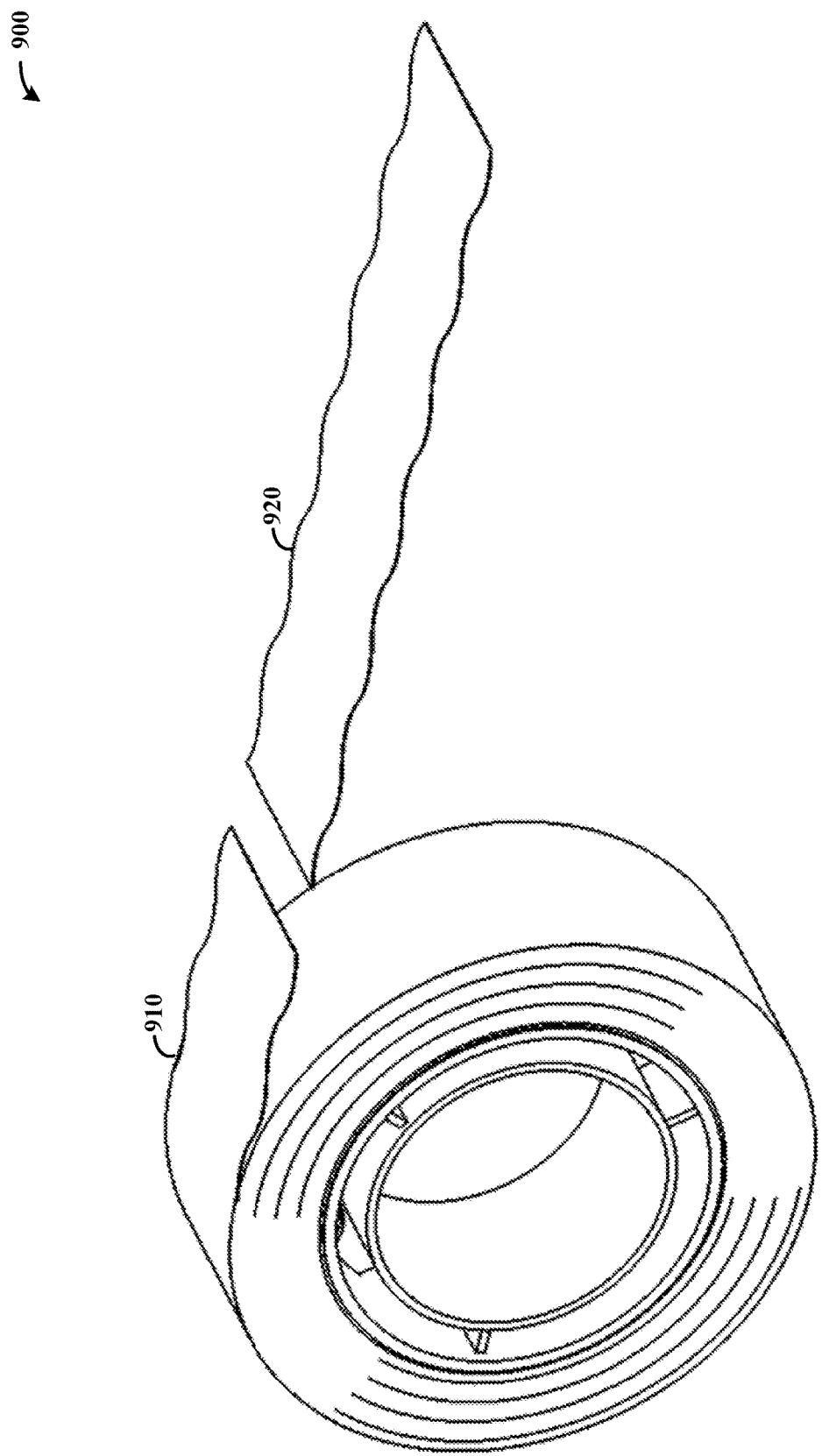
FIG. 9 shows a roll of patching material having a plurality of film layers, as may be implemented in accordance with one or more embodiments.

FIG. 9 shows a roll of patching material 900 having a plurality of film layers, as may be implemented in accordance with one or more embodiments. The patching material 900 may, for example, include layers as depicted in FIGS. 7 and/or 8. In some embodiments, the patching material 900 has regions for separation to provide a particular length of matching material, as shown by way of example with a portion 910 remaining on the roll with detached portion 920 separated therefrom.

Figure 10:
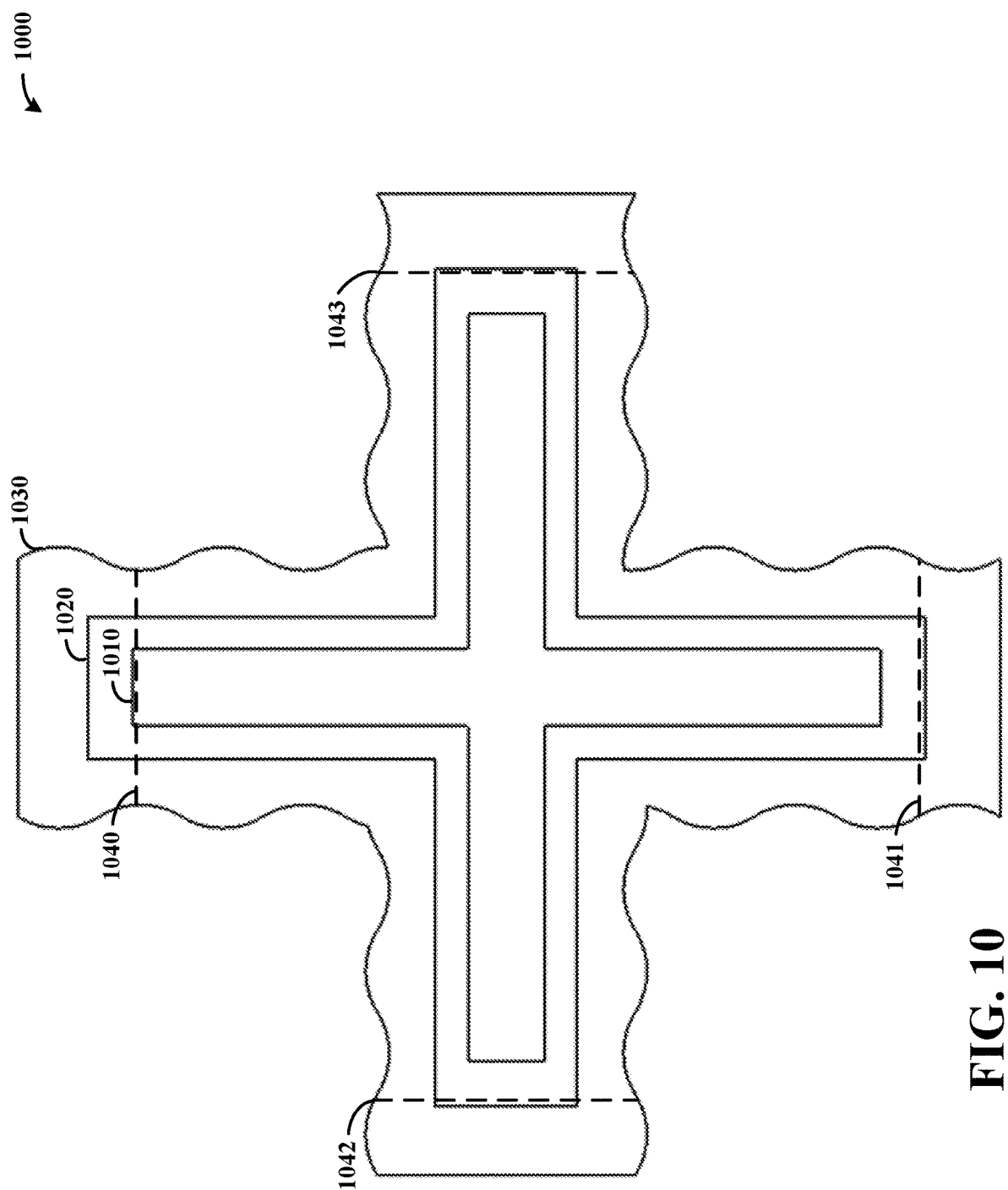
FIG. 10 shows a joint tape intersection having a plurality of film layers, as may be implemented in accordance with one or more embodiments.

FIG. 10 shows a joint tape intersection patch 1000 having a plurality of film layers, as may be implemented in accordance with one or more embodiments. The patch 1000 includes a base layer 1010 and stacked layers 1020 and 1030. The (top) layer 1030 is shown with a contoured edge. The stacked layers 1020 and 1030 are adhered to an underlying layer, and all layers have an adhesive for adhering to a surface, such as at an intersection of respective wall boards. More or fewer such stacked layers may be used, and may be implemented in a manner similar to that depicted with other embodiments herein. In some implementations, the patch 1000 is truncated or separable at dashed lines 1040, 1041, 1042 and 1043, such as to facilitate utilization with an elongated strip of joint tape/patch such as depicted in FIG. 8. For instance, the joint tape/patch 800 may be aligned such that lower edge 802 of the joint tape/patch 800 is aligned with upper edge 1040 (when truncated) of patch 1000. For such application, the number and width of stacked layers in the patch 1000 may be matched to that of joint tape/patch 800.

Figure 11:
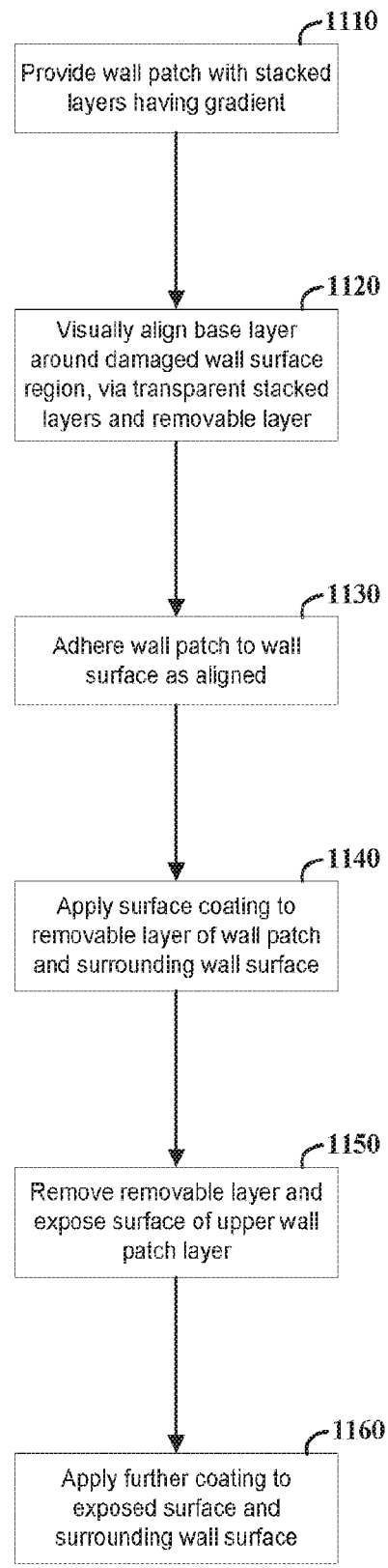
FIG. 11 is a flow diagram depicting a method for patching a wall, as may be implemented in accordance with one or more embodiments.

FIG. 11 is a flow diagram depicting a method for patching a wall, as may be implemented in accordance with one or more embodiments. At block 1110, a wall patch is provided, which may include a gradient as characterized herein and defined by successively stacked layers of increasing surface area/dimension that extends beyond an underlying surface (e.g., as depicted in FIGS. 4-5). The wall patch may be provided on a transfer layer, for instance as may include a sheet type material from which the wall patch, including adhesive on an underside of the wall patch, may be removed/peeled from the transfer layer. A base layer of the wall patch is then visually aligned around a damaged wall surface at block 1120, by viewing the base layer (e.g., a color, tinted area, perimeter or other alignment feature) through the overlying stacked layers and removable layer on top of the patch. This may, for example, involve ensuring that the base layer extends entirely around a damaged region in a wall, and may further involve selecting the wall patch having a size that is sufficient to cover the damage. In certain instances, the damaged wall surface is prepared, such as by sanding and cleaning, prior to application of the wall patch. The aligned patch is adhered to the wall surface at block 1130 utilizing adhesive, for instance as provided with the patch, applied to an underside of the patch and/or applied to the wall surface.

Once the wall patch is applied to the wall surface, a variety of finishing approaches may be implemented. In some implementations, a surface coating such as paint is applied to the top removable layer of the wall patch as well as to surrounding surface area of the wall, at block 1140. The removable layer is then removed at block 1150 (also removing the coating applied thereto), and a further coating may be applied to the wall patch surface exposed via removal of the removable layer and to the surrounding wall surface at block 1160. In some instances, the coating applied to the removable layer is allowed to dry to touch, for instance 10-15 minutes, prior to removing the removable layer. Additional coatings may also be applied. The exposed wall patch surface may further be provided, for example, with characteristics that facilitate application of the coating. In connection with such aspects, it has been recognized/discovered that application of successive coatings in this manner, with removal of the removable layer, mitigates visibility of the wall patch (and related wall repair) by the human eye.

Based upon the above discussion and illustrations, those skilled in the art will readily recognize that various modifications and changes may be made to the various embodiments without strictly following the exemplary embodiments and applications illustrated and described herein. For example, various thicknesses and diameters of layers of an apparatus such as a wall patch may be implemented to suit particular applications. For instance, the apparatus as depicted in FIG. 4 may be scaled and used as a wall patch to suit a variety of different types and sizes of wall damage regions. Further, fewer or additional layers may be used as is needed relative to damage size and related mitigation of visual recognition of the layers (e.g., additional layers may be utilized for a wall patch for patching larger holes or damage regions, to provide a desired edge gradient along the wall patch). Such modifications do not depart from the true spirit and scope of various aspects of the invention, including aspects set forth in the claims.

What is claimed is:

1. A method for patching a wall, the method comprising:
providing a wall patch including:
  a base layer of material having upper and lower surfaces; and
  a plurality of layers of transparent material stacked on the upper surface of the base layer, including a first one of the layers stacked on the base layer and each of the other layers stacked on one of the other layers, each of the plurality of layers having a lower surface area that extends laterally beyond the layer upon which it is stacked;
aligning the wall patch relative to an opening in a wall surface, with a perimeter of the base layer extending around at least a portion of the opening and with the lower surface of the base layer facing the opening and in contact with a portion of the wall surface adjacent the opening; and
adhering the wall patch to the wall surface by adhering exposed regions of the lower surfaces of the plurality of layers and base layer to the surface around the opening.

2. The method of claim 1, wherein providing the wall patch includes providing adhesive on the exposed regions of the lower surfaces of the plurality of layers and base layer.

3. The method of claim 1, wherein providing the wall patch includes providing a top one of the plurality of layers with a thickness greater than the plurality of layers and the base layer over which it is stacked.

4. The method of claim 1, wherein providing the wall patch includes providing a removable layer on a top one of the plurality of layers, the removable layer having a graspable feature, further including removing the removable layer, after adhering the wall patch to the wall surface.

5. The method of claim 1, wherein providing the wall patch includes providing a removable layer on a top one of the plurality of layers, the removable layer having a graspable feature, further including, after adhering the wall patch to the wall surface:
applying a first coating to an upper surface of the removable layer and to the wall surface around the wall patch;
after applying the first coating, removing the removable layer to expose an upper surface of the top one of the plurality of layers; and
after removing the removable layer, applying a second coating to the upper surface of the top one of the plurality of layers and to the first coating.

6. The method of claim 1, wherein providing the wall patch includes:
providing a removable layer on a top one of the plurality of layers, the removable layer having a graspable feature; and
providing a transfer layer and temporarily adhering the wall patch to the transfer layer with the base layer in contact with the transfer layer.

7. The method of claim 6, further including removing the transfer layer, prior to aligning the wall patch.

8. The method of claim 1, wherein providing the wall patch includes providing the wall patch with a stepped gradient defined by respective perimeters of the base layer and layers of transparent material stacked thereon, the gradient being defined by thicknesses of the layers and the lower surface area extending beyond the layer upon which each layer is stacked.

9. The method of claim 1, wherein providing the wall patch includes:
providing a plurality of wall patches having different sizes and numbers of layers, including a patch of greater size and a patch of smaller size, the patch of the greater size having a greater number of layers relative to the patch of the smaller size, and selecting one of the wall patches based on a size of the opening in the wall surface; and
aligning the wall patch and adhering the wall patch includes aligning and adhering the selected wall patch.

10. The method of claim 1, wherein adhering the exposed regions of the lower surfaces of the plurality of layers and base layer to the surface around the opening includes adhering the exposed regions of the lower surfaces of the plurality of layers and base layer to a planar outer surface of the wall.

11. A method comprising:
arranging a base layer of material having upper and lower surfaces with a perimeter of the base layer extending around at least a portion of an opening in a planar surface and with the lower surface of the base layer facing the opening and in contact with a portion of the planar surface adjacent the opening;
stacking a plurality of layers of material on the upper surface of the base layer, by stacking a first one of the layers on the base layer and stacking each of the other layers directly on one of the other layers, at least one of the stacked layers having a lower surface area that is larger than a lower surface area of one of the layers on which it is directly stacked; and
adhering the base layer and the plurality of layers to the planar surface and around the opening therein, by adhering an exposed region of the lower surface of the at least one of the stacked layers to the planar surface around the opening.

12. The method of claim 11, wherein stacking the plurality of layers includes forming a stepped gradient defined by respective perimeters of the stacked layers and increasing in diameter from the base layer in a direction away from the planar surface.

13. The method of claim 11, wherein stacking the plurality of layers includes providing a top one of the stacked layers with a thickness that is greater than a thickness of the layers upon which the top one of the stacked layers is stacked.

14. The method of claim 11, wherein each of a plurality of the stacked layers has a lower surface with an inner surface region in contact with one of the stacked layers on which it is directly stacked and an outer surface region that extends laterally beyond and around the perimeter of the one of the stacked layers on which it is directly stacked.

15. The method of claim 14, wherein the outer surface region of each of the plurality of stacked layers has an adhesive, wherein adhering the base layer and the plurality of layers to the planar surface includes adhering ones of the exposed regions of the plurality of stacked layers that extend around the opening to the planar surface.

16. The method of claim 14, wherein stacking the plurality of layers of material includes adhering at least one of the stacked layers to one of the layers on which it is stacked.

17. The method of claim 11, further including using the base layer and the stacked layers to provide stiffness that mitigates deflection of the layers into the opening.

18. The method of claim 11, including providing an upper one of the stacked layers, which covers the other stacked layers and the base layer, with an upper surface region configured to adhere to a surface coating when applied to the upper surface region.

19. The method of claim 11, further including:
stacking a removable layer on a top one of the plurality of layers, the removable layer having a graspable tab; and
after adhering the base layer and the plurality of layers to the planar surface, removing the removable layer to expose an upper surface of the top one of the plurality of layers.

20. The method of claim 11, further including:
stacking a removable layer on a top one of the plurality of layers, the removable layer having a graspable tab;
applying a first coating to the upper surface of the removable layer and to the planar surface to which the base layer and the plurality of layers are adhered;
after applying the first coating, removing the removable layer to expose an upper surface of the top one of the plurality of layers; and
after removing the removable layer, applying a second coating to the upper surface of the top one of the plurality of layers and on the first coating.

21. A method for patching a wall, the method comprising:
adhering a wall patch to a wall surface having a damaged region, the wall patch having a base layer and a plurality of layers of transparent material stacked on the base layer, the base layer being visible through the transparent material, including aligning the base layer around the damaged region;
applying a surface coating to an area of the wall surface around the wall patch and to a removable top layer of the plurality of layers of transparent material;
removing the removable top layer and therein exposing a top surface of an underlying one of the plurality of layers of transparent material; and
applying a further coating to the exposed top surface of the underlying one of the plurality of layers of transparent material, and to the area of the wall surface around the wall patch.

\* \* \* \* \*